United States Patent
Balcha et al.

(10) Patent No.: US 9,558,111 B1
(45) Date of Patent: Jan. 31, 2017

(54) STORAGE SPACE RECLAIMING FOR VIRTUAL PROVISIONING

(75) Inventors: Muralidhar Balcha, Upton, MA (US); Patrick Jiang, Beijing (CN); William Huang, Beijing (CN); Txomin Barturen, Issaquah, WA (US)

(73) Assignee: EMC IP Holding Comapny LLC, Hopkinton, MA (US)

( * ) Notice: Subject to any disclaimer, the term of this patent is extended or adjusted under 35 U.S.C. 154(b) by 1581 days.

(21) Appl. No.: 12/924,388

(22) Filed: Sep. 27, 2010

(51) Int. Cl.
*G06F 12/02* (2006.01)

(52) U.S. Cl.
CPC ......... *G06F 12/0253* (2013.01); *G06F 12/023* (2013.01)

(58) Field of Classification Search
None
See application file for complete search history.

(56) References Cited

U.S. PATENT DOCUMENTS

| | | |
|---|---|---|
| 5,206,939 A | 4/1993 | Yanai et al. |
| 5,742,792 A | 4/1998 | Yanai et al. |
| 5,778,394 A | 7/1998 | Galzur et al. |
| 5,845,147 A | 12/1998 | Vishlitzky et al. |
| 5,857,208 A | 1/1999 | Ofek |
| 2006/0069887 A1 | 3/2006 | LeCrone et al. |
| 2009/0070541 A1 | 3/2009 | Yochai et al. |
| 2009/0089516 A1* | 4/2009 | Pelts et al. ............ 711/154 |
| 2011/0153977 A1* | 6/2011 | Root et al. ............ 711/171 |
| 2011/0307529 A1* | 12/2011 | Mukherjee et al. ......... 707/813 |

OTHER PUBLICATIONS

"EMC CLARiiON Virtual Provisioning, Applied Technology," EMC Corporation, White paper, Aug. 2008, 16 pp.
"EMC Symmetrix Virtual Provisioning, Applied Technology," EMC Corporation, White paper, Jun. 2008, 12 pp.
"Implementing Virtual Provisioning on EMC Symmetrix DMX with VMware Virtual Infrastructure," EMC Corporation, White paper, 2008, 30 pp.
U.S. Appl. No. 11/823,156, filed Jun. 27, 2007, Burke et al.
U.S. Appl. No. 11/823,152, filed Jun. 27, 2007, Burke.
U.S. Appl. No. 11/903,869, filed Sep. 25, 2007, Veprinsky.
U.S. Appl. No. 12/586,837, filed Sep. 29, 2009, LeCrone et al.
U.S. Appl. No. 12/592,988, filed Dec. 7, 2009, Martin et al.

* cited by examiner

*Primary Examiner* — Reginald Bragdon
*Assistant Examiner* — Thanh Vo
(74) *Attorney, Agent, or Firm* — Muirhead and Saturnelli, LLC

(57) ABSTRACT

A reclaim system frees previously allocated, but currently unused, storage space in a thin or virtual provisioning environment. The reclaim system may be used in connection with a maintenance operation performed upon determining that significant allocated space of a thin device is no longer being used or may be performed periodically to analyze a thin device and free appropriate space back to a thin device storage pool. In an embodiment, the reclaim system may run online while user applications are accessing a target storage volume.

20 Claims, 16 Drawing Sheets

STORAGE SPACE RECLAIMING FOR VIRTUAL PROVISIONING

TECHNICAL FIELD

This application relates to storage devices and, more particularly, to the field of data management of data stored on storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Thin provisioning (also referred to as virtual provisioning) storage systems present a large amount of storage capacity to a host, but consume space only as needed from a shared pool. The devices of thin provisioning are known as thin devices or thin LUNs. With thin devices, the host visible capacity (e.g., storage perceived by the applications) is larger than the actual allocated space on the storage system. This simplifies the creation and allocation of storage capacity. Thin devices may be sized to accommodate growth without regard for currently available assets. Physical storage is assigned to the server in a capacity-on-demand fashion from a shared pool.

Thin devices may be expanded as a file system runs, but may not be easily shrunk. Once allocated, storage spaces may not be later recycled even if they are freed by the file system. Known systems and techniques for reclaiming space, such as the Solutions Enabler product by EMC Corporation of Hopkinton, Mass. and use of the "symconfigure" command, include checking all the storage chunks allocated for a specified thin device and unmapping or otherwise freeing the allocated, but unwritten, storage chunks only if the storage chunks contain all zeroes. Space reclamation may not occur if any byte of a storage chunk is not zeroed. Utilities, such as SDelete from Microsoft Corporation of Redmond, Wash., may be used to fill unused spaces of a volume with zeroes; however, such utilities may generate a large number of write I/Os that may have a disadvantageous impact on the system and other applications.

Accordingly, it would be desirable to provide a system that provides for efficient reclaiming of unused storage space in thin or virtual provisioning storage systems.

SUMMARY OF THE INVENTION

According to the system described herein, a method for reclaiming storage space in a thin provisioning environment is provided. The method includes creating at least one balloon file in a target volume, wherein the at least one balloon file corresponds to storage space to be reclaimed from the target volume, and wherein the storage space to be reclaimed includes allocated storage space of the thin provisioning environment. Information of the at least one balloon file in the target volume is obtained. Storage space of the at least one balloon file is reclaimed according to the obtained information. The at least one balloon file is deleted, wherein, after deleting the at least one balloon file, the reclaimed storage space is available for use in a storage pool of the thin provisioning environment. The target volume may be analyzed allocated storage space on the target volume that is unused may be determined. The target volume may include allocated storage space that is unused, and the storage space to be reclaimed may include at least a portion of the allocated and unused storage space. Obtaining information of the at least one balloon file in the target volume may include initiating a file system routine that obtains the information and/or sending the information from the target volume. I/O requests to the target volume may be monitored and, if an I/O request to the target volume is indicated as having failed due to lack of storage space, reclaim processing may be aborted and the I/O request reissued.

According further to the system described herein, a non-transitory computer readable medium stores computer software for reclaiming storage space in a thin provisioning environment, the computer software comprising executable code to perform functions. Executable code may be provided that creates at least one balloon file in a target volume, wherein the at least one balloon file corresponds to storage space to be reclaimed from the target volume, and wherein the storage space to be reclaimed includes allocated storage space of the thin provisioning environment. Executable code may be provided that obtains information of the at least one balloon file in the target volume. Executable code may be provided that reclaims storage space of the at least one balloon file according to the obtained information. Executable code may be provided that deletes the at least one balloon file, wherein, after deleting the at least one balloon file, the reclaimed storage space is available for use in a storage pool of the thin provisioning environment. Executable code may be provided that analyzes the target volume and determining allocated storage space on the target volume that is unused. The target volume may include allocated storage space that is unused, and wherein the storage space to be reclaimed includes at least a portion of the allocated and unused storage space. The executable code that obtains information of the at least one balloon file in the target volume may include executable code that initiates a file system routine that obtains the information and/or executable code that sends the information from the target volume. Executable code may be provided that monitors I/O requests to the target volume. Executable code may be provided that, if an I/O request to the target volume is indicated as having failed due to lack of storage space, aborts reclaim processing and reissues the I/O request.

According further to the system described herein, a reclaim system for reclaiming storage space in a thin provisioning environment is provided. The system includes a processor and a reclaim application executed by the processor. The reclaim application may create at least one balloon file in a target volume, wherein the at least one balloon file corresponds to storage space to be reclaimed from the target volume, and wherein the storage space to be reclaimed includes allocated storage space of the thin provisioning environment. The reclaim application may obtain information of the at least one balloon file in the target volume. The reclaim application may reclaim storage space of the at least one balloon file according to the obtained information. The reclaim application may delete the at least one balloon file, wherein, after deleting the at least one balloon file, the reclaimed storage space is available for use in a storage pool of the thin provisioning environment. A reclaim driver may receive commands from the reclaim application and sends reclaim commands to the target volume. A reclaim file system filter driver may monitor I/O requests for the target volume. The target volume may include allocated storage space that is unused, and wherein the storage space to be reclaimed includes at least a portion of the allocated and unused storage space. Obtaining information of the at least one balloon file in the target volume may include initiating a file system routine that obtains the information and/or sending the information from the target volume.

BRIEF DESCRIPTION OF THE DRAWINGS

Embodiments of the system are described with reference to the several figures of the drawings, which are briefly described as follows.

DETAILED DESCRIPTION OF VARIOUS EMBODIMENTS

Figure 1:
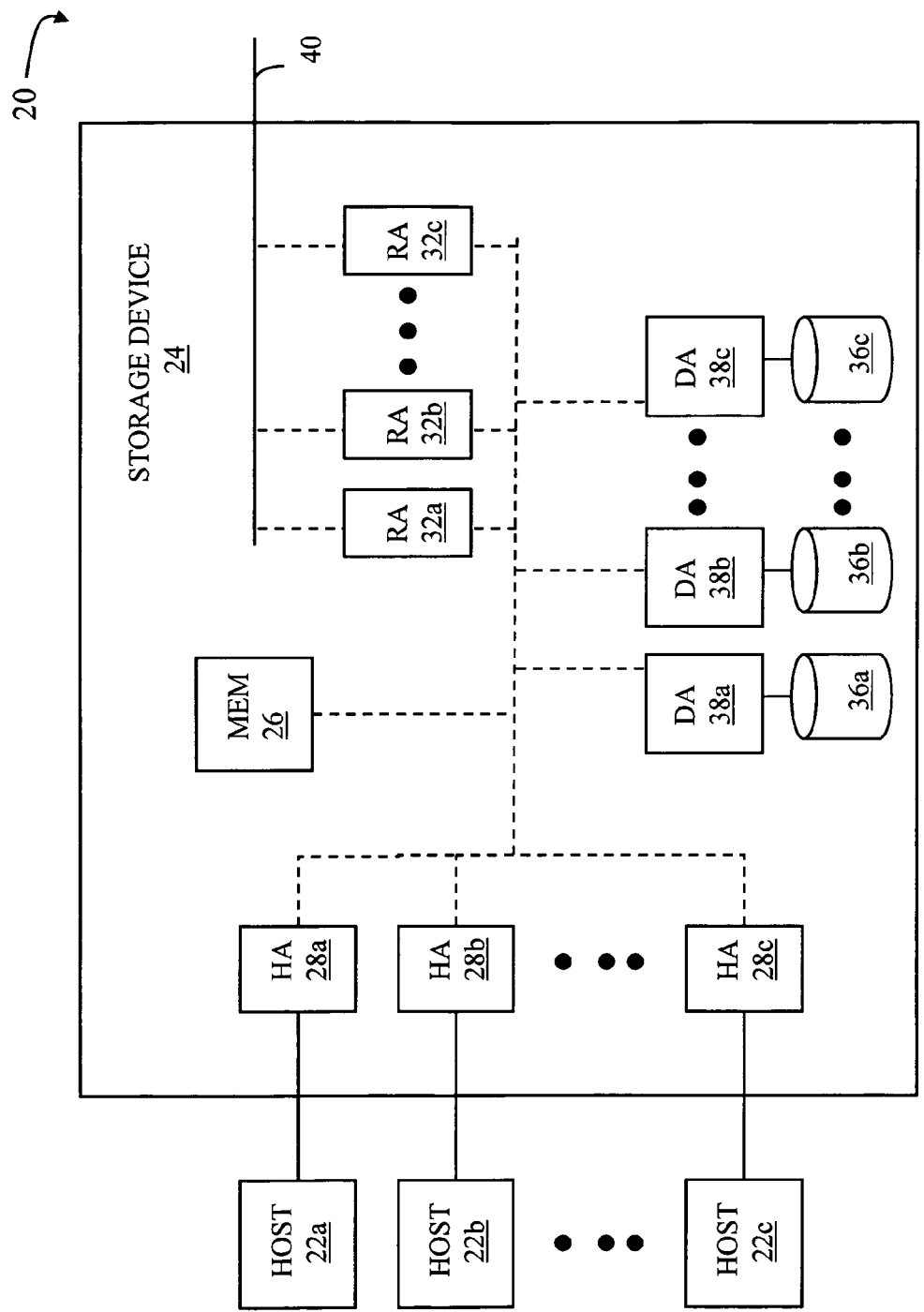
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but may be used to transfer data between the storage device 24 and other storage devices (see FIG. 3 and corresponding description) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Patent App. Pub. No. 2006-0069887 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors, and a network on which the system may be implemented may include any suitable network, including an intranet or the Internet.

Figure 2:
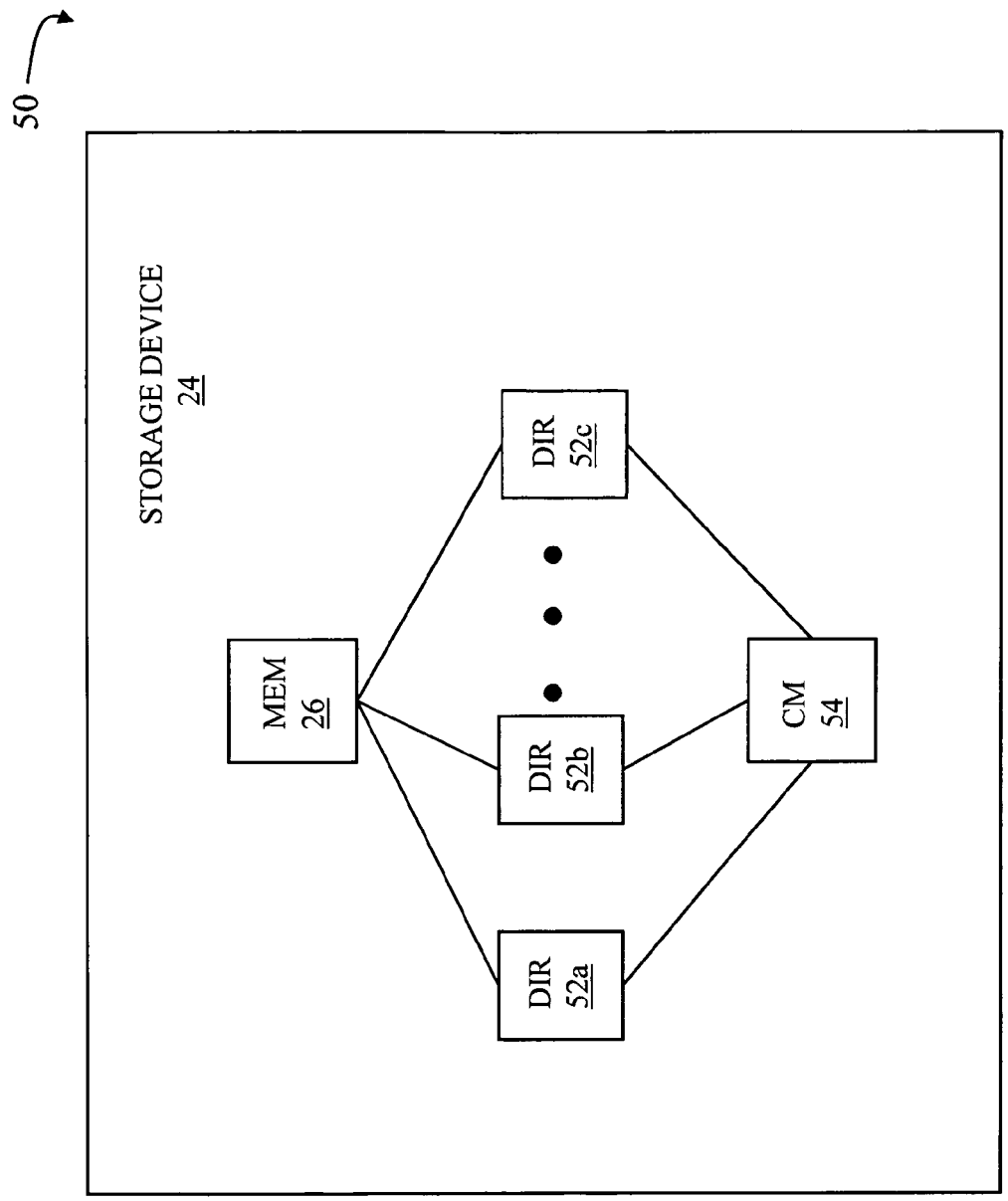
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
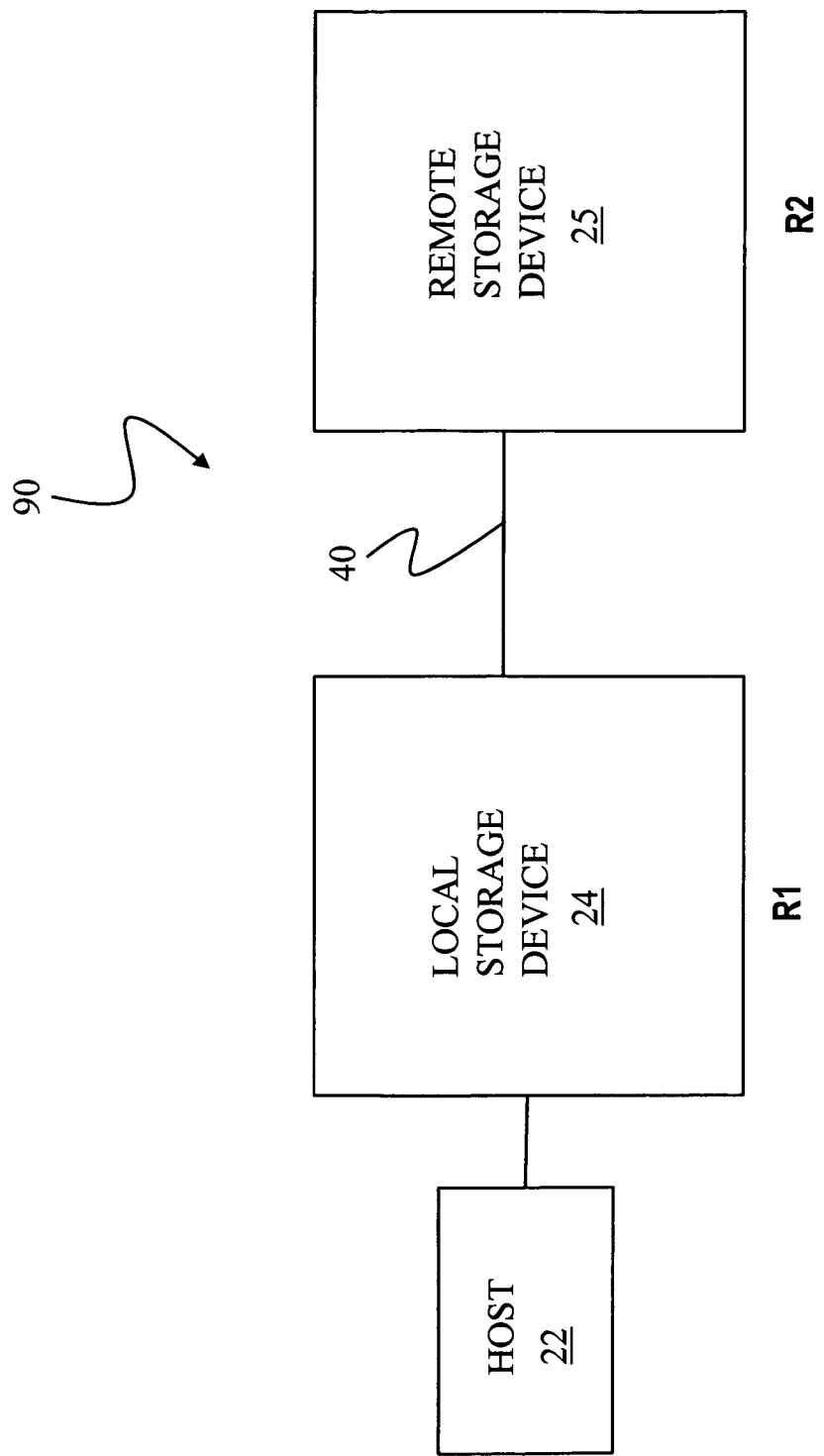
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the RDF link 40. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the RDF link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein In an embodiment, the system described herein may be used in connection with SRDF synchronous (SRDF/S) transfers. For an SRDF/S transfer, data written from one of the hosts 22a-22c to the local storage device 24 may be stored locally, for example on one of the data volumes 36a-36c of the local storage device 24 while being transferred from the local storage device 24 to the remote storage device 25. Receipt by the remote storage device 25 is then acknowledged to the local storage device 24 which then provides an acknowledge of the initial write back to the appropriate one of the hosts 22a-22c. In other embodiments, the system described herein may also be used in connection with, or in combination with, other modes of data transfer including, for example, asynchronous (SRDF/A) transfers and/or other appropriate data transfer systems and devices.

Figure 4:
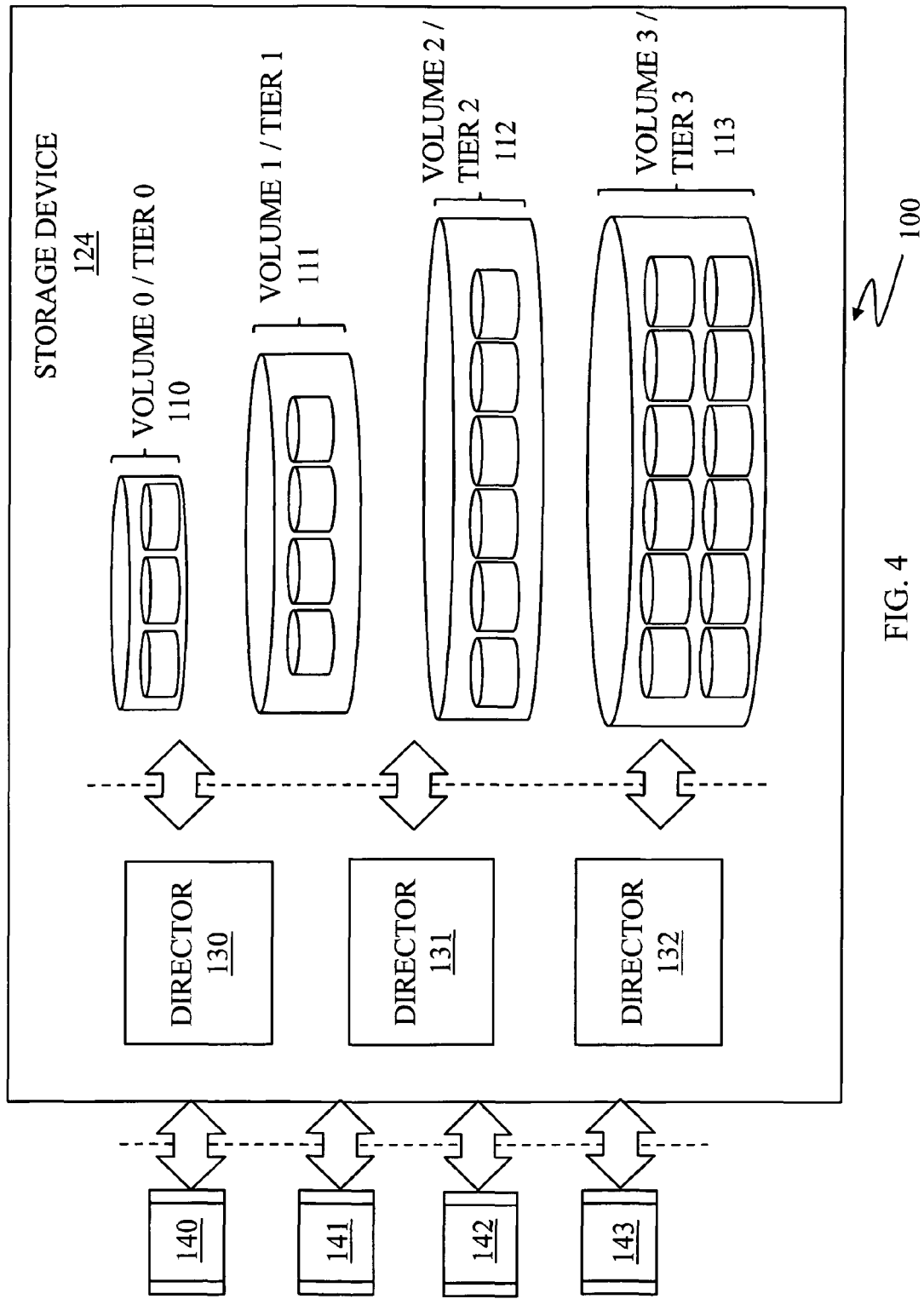
FIG. 4 is a schematic illustration showing a storage system according to an embodiment of the system described herein.

FIG. 4 is a schematic illustration showing a storage system 100 according to an embodiment of the system described herein. The storage system 100 may include a storage device 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage device 124 that are facilitated using one or more of the directors 130-132. The storage device 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Various techniques concerning the management of data between volumes on multiple storage tiers and/or between multiple storage tiers within a single volume, including the use of thin provisioning technology, are discussed, for example, in U.S. patent applications: U.S. Ser. No. 11/726,831 to Yochai et al., filed Mar. 23, 2007, entitled "Automated Information Life-Cycle Management With Thin Provisioning" and published on Mar. 12, 2009 as U.S. Patent App. Pub. No. 2009/0070541 A1; U.S. Ser. No. 11/823,156 to Burke et al., filed Jun. 27, 2007, entitled "Fine Grained Tiered Storage With Thin Provisioning;" U.S. Ser. No. 11/823,152 to Burke, filed Jun. 27, 2007, entitled "Storage Management For Fine Grained Tiered Storage With Thin Provisioning;" U.S. Ser. No. 11/903,869 to Veprinsky, filed Sep. 25, 2007, entitled "Data De-Duplication Using Thin Provisioning;" U.S. Ser. No. 12/586,837 to LeCrone et al., filed Sep. 29, 2009, entitled "Sub-Tiering Data At The Volume Level;" and U.S. Ser. No. 12/592,988 to Martin et al., filed Dec. 7, 2009, entitled "Normalizing Capacity Utilization Within Virtual Storage Pools," which are all incorporated herein by reference. Techniques similar to those discussed above may be implemented in one or more Virtual Provisioning products produced by EMC Corporation of Hopkinton, Mass., such as EMC CLARiiON Virtual Provisioning and/or EMC Symmetrix Virtual Provisioning, and may be used in connection with the system described herein.

According to various embodiments, each of the volumes 110-113 may be located in different storage tiers. Tiered storage provides that data may be initially allocated to a particular fast volume/tier, but a portion of the data that has not been used over a period of time may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Figure 5:
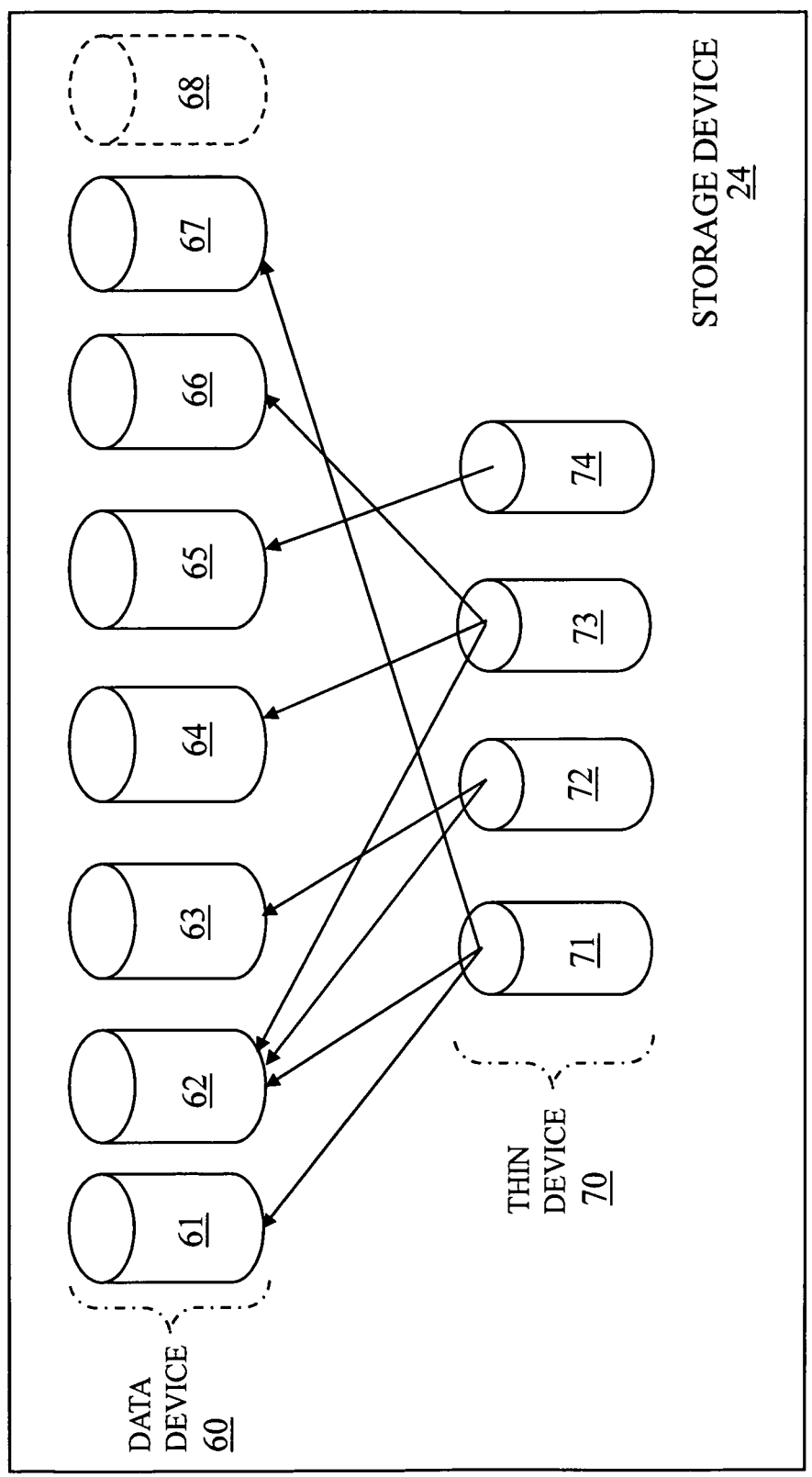
FIG. 5 is a schematic diagram showing the storage device as including one or more data devices and one or more thin devices according to an embodiment of the system described herein.

FIG. 5 is a schematic diagram showing the storage device 24 as including a plurality of data devices 61-68 and a plurality of thin devices 71-74 that may be used in connection with the system described herein. Alternatively, in other embodiments that may be used in connection with the system described herein, instead of being separate devices, the data devices 61-68 may be sections of one data device 60 and, similarly, the thin devices 71-74 may be sections of one thin device 70. Further, the thin devices 71-74, and/or sections of the thin device 70, may be incorporated into the storage device 24 and/or may be stored and accessed externally to the storage device 24. The data devices 61-68 may be implemented as a logical device like standard logical devices provided in a Symmetrix data storage device produced by EMC Corporation of Hopkinton, Mass. The data device section 68 is illustrated with broken lines to indicate that the data device section 68 does not yet exist but may be created, as further discussed elsewhere herein. In some embodiments, the data device sections 61-67 may not be directly useable (visible) to hosts coupled to the storage device 24. Each of the data devices sections 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices sections 61-67 may be designated as corresponding to different classes, so that different ones of the data devices 61-67 correspond to different physical storage having different relative access speeds or RAID (redundant array of independent disks) protection type or some other relevant distinguishing characteristic or combination of characteristics.

The thin devices 71-74 may appear to a host coupled to the storage device 24 as a logical volume (logical device) containing a contiguous block of data storage. Each of the thin devices 71-74 may contain pointers to some or all of the data devices 61-67 (or portions thereof), as further discussed elsewhere herein. As illustrated, in some embodiments, only one thin device may be associated with a data device while, in other embodiments, multiple thin devices may be associated with the same data devices. In some instances, an implementation according to the system described herein may allow for hybrid logical devices where a single logical volume has portions that behave as a data device and/or portions that behave as a thin device.

A thin device presents a logical storage space to one or more applications running on a host where different portions of the logical storage space may or may not have corresponding allocated physical storage space associated therewith. However, the thin device may not be mapped directly to physical storage space. Instead, for example, portions of the thin storage device for which physical storage space exists may be mapped to one or more data devices, which are logical devices that map logical storage space of the data device to physical storage space on the disk drives 36a-36c. As further discussed elsewhere herein, an access of the logical storage space of the thin device may result in either a null pointer (or equivalent) indicating that no corresponding physical storage space has yet been allocated, or results in a reference to a data device (or section thereof) which in turn references the underlying physical storage space.

Figure 6:
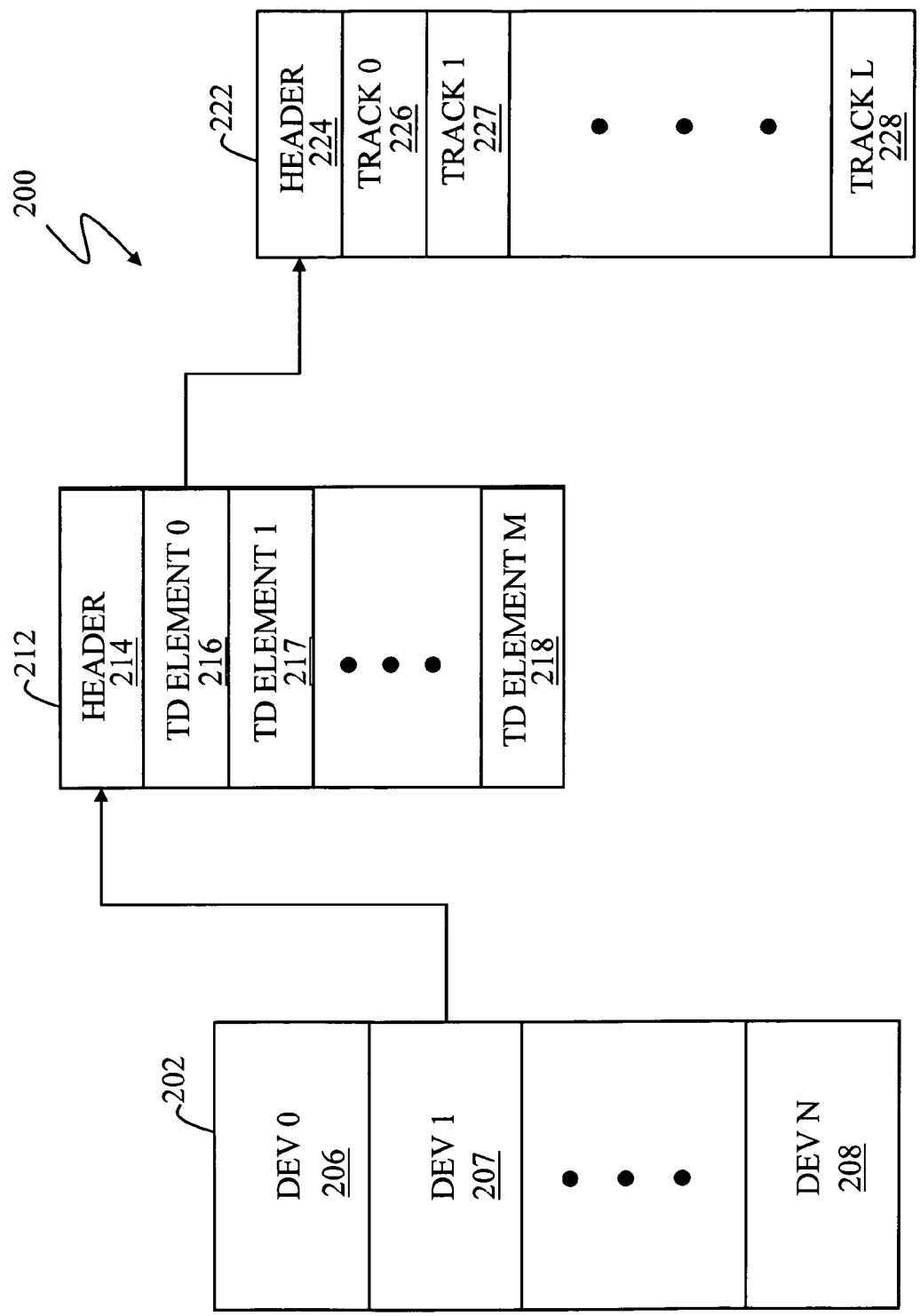
FIG. 6 is a schematic diagram illustrating tables that are used to keep track of device information according to an embodiment of the system described herein.

FIG. 6 is a diagram 200 illustrating tables that are used to keep track of device information according to an embodiment of the system described herein. A first table 202 corresponds to all of the devices used by a storage device or by an element of a storage device, such as an HA and/or a DA. The table 202 includes a plurality of logical device (logical volume) entries 206-208 that correspond to all the logical devices used by the storage device (or portion of the storage device). The entries in the table 202 may include information for thin devices, for data devices, for standard logical devices, for virtual devices, for business continuance volume (BCV) devices, and/or any or all other types of logical devices used in connection with the system described herein.

Each of the entries 206-208 of the table 202 correspond to another table that may contain information for one or more sections of a logical volume, such as a thin device logical volume. For example, the entry 207 may correspond to a thin device table 212. The thin device table 212 may include a header 214 that contains overhead information, such as information identifying the corresponding thin device, information concerning the last used data device and/or other information including counter information, such as a counter that keeps track of used group entries (described below). The header information, or portions thereof, may be available globally to the storage device 24.

The thin device table 212 may include one or more group elements 216-218, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 216-218 (for example, the group element 216) of the thin device table 212 may identify a particular one of the data devices 61-67 having a track table 222 that contains further information, such as a header 224 having overhead information and a plurality of entries 226-228 corresponding to each of the tracks of the particular one of the data device sections 61-67. The information in each of the entries 226-228 may include a pointer (either direct or indirect) to the physical address on one of the disk drives 36a-36c of the storage device 24 (or a remote storage device 25 if the system is so configured) that maps to the logical address(es) of the particular one of the data devices 61-67. Thus, the track table 222 may be used in connection with mapping logical addresses of the logical device sections corresponding to the tables 202, 212, 222 to physical addresses on the disk drives 36a-36c of the storage device 24.

The tables 202, 212, 222 may be stored in the global memory 26 of the storage device 24. In addition, the tables corresponding to particular logical device sections accessed by a particular host may be stored (cached) in local memory of the corresponding one of the HA's 28a-28c. In addition, the RA's 32a-32c and/or the DA's 38a-38c may also use and locally store (cache) portions of the tables 202, 212, 222.

Figure 7:
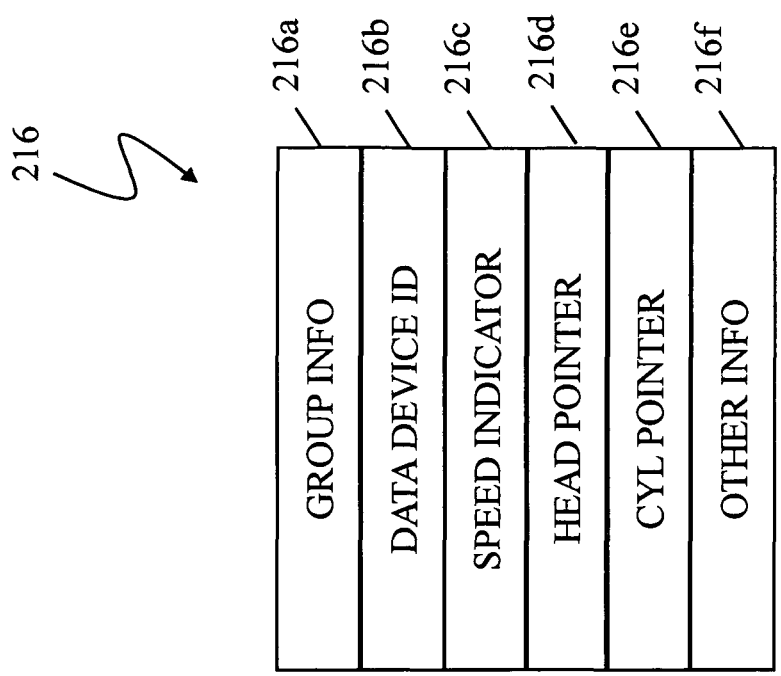
FIG. 7 is a schematic diagram illustrating a group element of the thin device table in connection with an embodiment of the system described herein.

FIG. 7 is a schematic diagram illustrating a group element 216 of the thin device table 212 in connection with an embodiment of the system described herein. The group element 216 may includes a plurality of entries 216a-216f. The entry 216a may provide group information, such as a group type that indicates whether there has been physical address space allocated for the group. The entry 216b may include information identifying one (or more) of the data devices 61-67 that correspond to the group (i.e., the one of the data devices 61-67 that contain pointers for physical data for the group). The entry 216c may include other identifying information for the one of the data devices 61-67, including a speed indicator that identifies, for example, if the data device is associated with a relatively fast access physical storage (disk drive) or a relatively slow access physical storage (disk drive). Other types of designations of data device sections are possible (e.g., relatively expensive or inexpensive, RAID protection type, number of mirrored copies, etc.). The entry 216d may be a pointer to a head of the first allocated track for the one of the data devices 61-67 indicated by the ID entry 216b. Alternatively, the entry 216d may point to header information of the data device track table 222 immediately prior to the first allocated track. The entry 216e may identify a cylinder of a first allocated track for the one the data devices 61-67 indicated by the ID entry 216b. The entry 216f may contain other information corresponding to the group element 216 and/or the corresponding thin device. In other embodiments, entries of the group table 216 may identify a range of cylinders of the thin device and a corresponding mapping to map cylinder/track identifiers for the thin device to tracks/cylinders of a corresponding data device. In an embodiment, the size of the group element 216 may be eight bytes.

Figure 8:
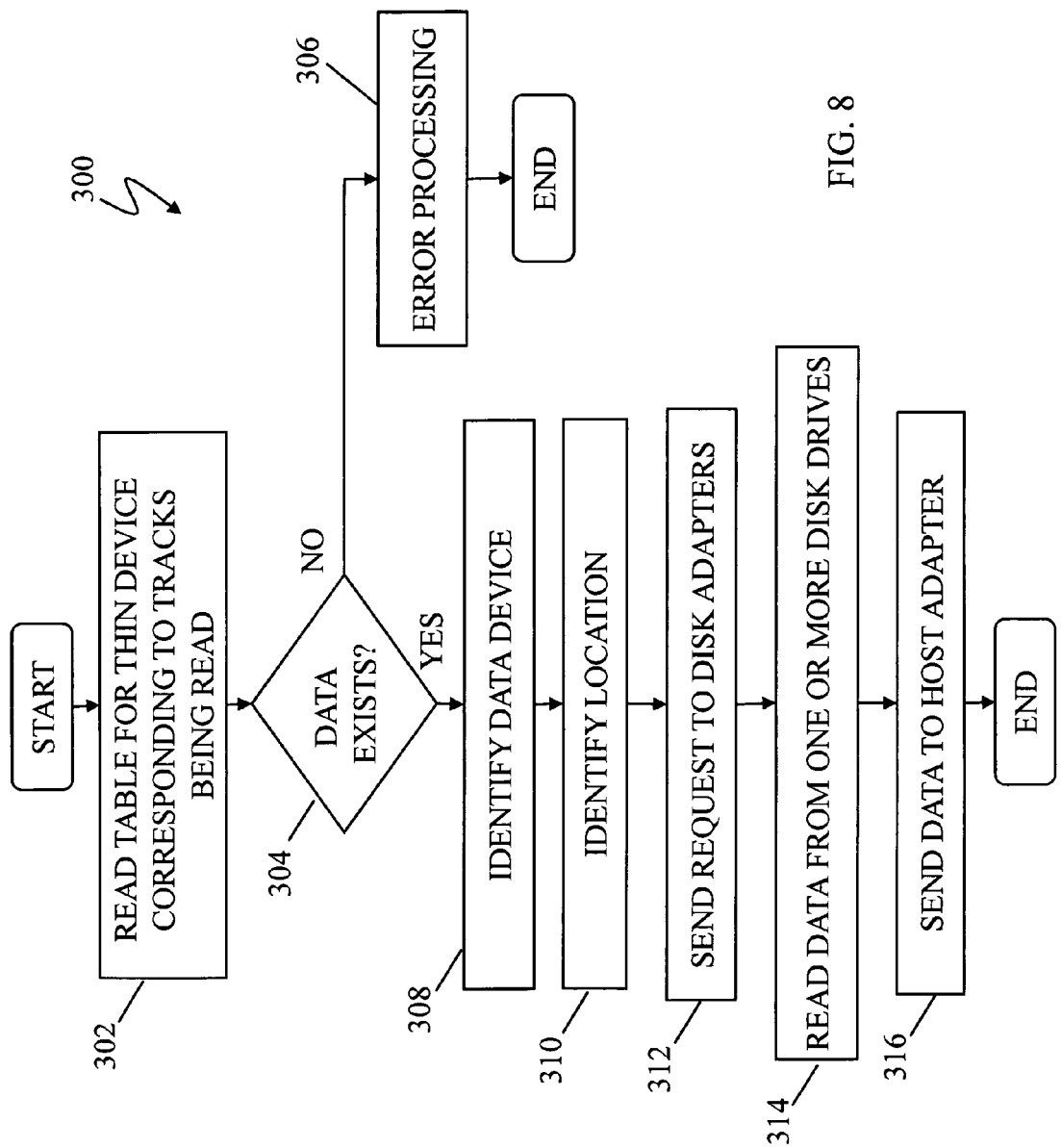
FIG. 8 is a flow diagram illustrating processing for handling a read of one or more logical tracks of one of the thin devices according to an embodiment of the system described herein.

FIG. 8 is a flow diagram 300 illustrating processing for handling a read of one or more logical tracks of one of the thin devices 71-74 in an embodiment of the system described herein. In a step 302, an appropriate one of the host adapters 28a-28c reads the group table 212 of the one of the thin devices 71-74 corresponding to the logical tracks being read. After the step 302, at a test step 304, it is determined whether the logical tracks identified from the group table 212 corresponds to any of the data devices 61-67 (i.e., if there is physical data corresponding to the logical tracks being read). If there is no corresponding physical data (meaning that no logical track(s) were ever written), then processing proceeds to a step 306 where error processing is performed, such as returning a NULL value to the host. Other appropriate error processing may be performed at the step 306. After the step 306, processing is complete.

If it is determined at the step 304 that there is physical data corresponding to the logical tracks being read, then processing proceeds to a step 308 where one or more of the data devices 61-67 associated with the logical tracks being read are identified from the group table 212. After the step 308, processing proceeds to a step 310 where the track table 222 is read from the identified one or more of the data devices 61-67 and the corresponding location of the physical data (i.e., cylinder and track) is determined. Logical storage space maps to physical storage space of the physical devices. After the step 310, processing proceeds to a step 312 where a request may be sent to one or more disk adapters 38a-38c corresponding to disk drives 36a-36c that provide the physical storage space associated with the identified one of the data devices 61-67 and corresponding location information. After the step 312, processing proceeds to a step 314 where the physical data is read. Note that the data may be stored in a cache or other memory (for example, the memory 26) in connection with being read. In some cases, if the data being read is already in the cache, then the processing at the step 812 and following steps may not be necessary. Note also that reading the data may include updating any metadata used to provide the processing described herein, such as the time last accessed, the host/user making the request, frequency of use, and/or any other appropriate metric. After the step 314, processing proceeds to a step 316 where the data may be received by an appropriate one of the host adapters 28a-28c (e.g., by reading the memory 26). After the step 316, processing is complete.

Figure 9:
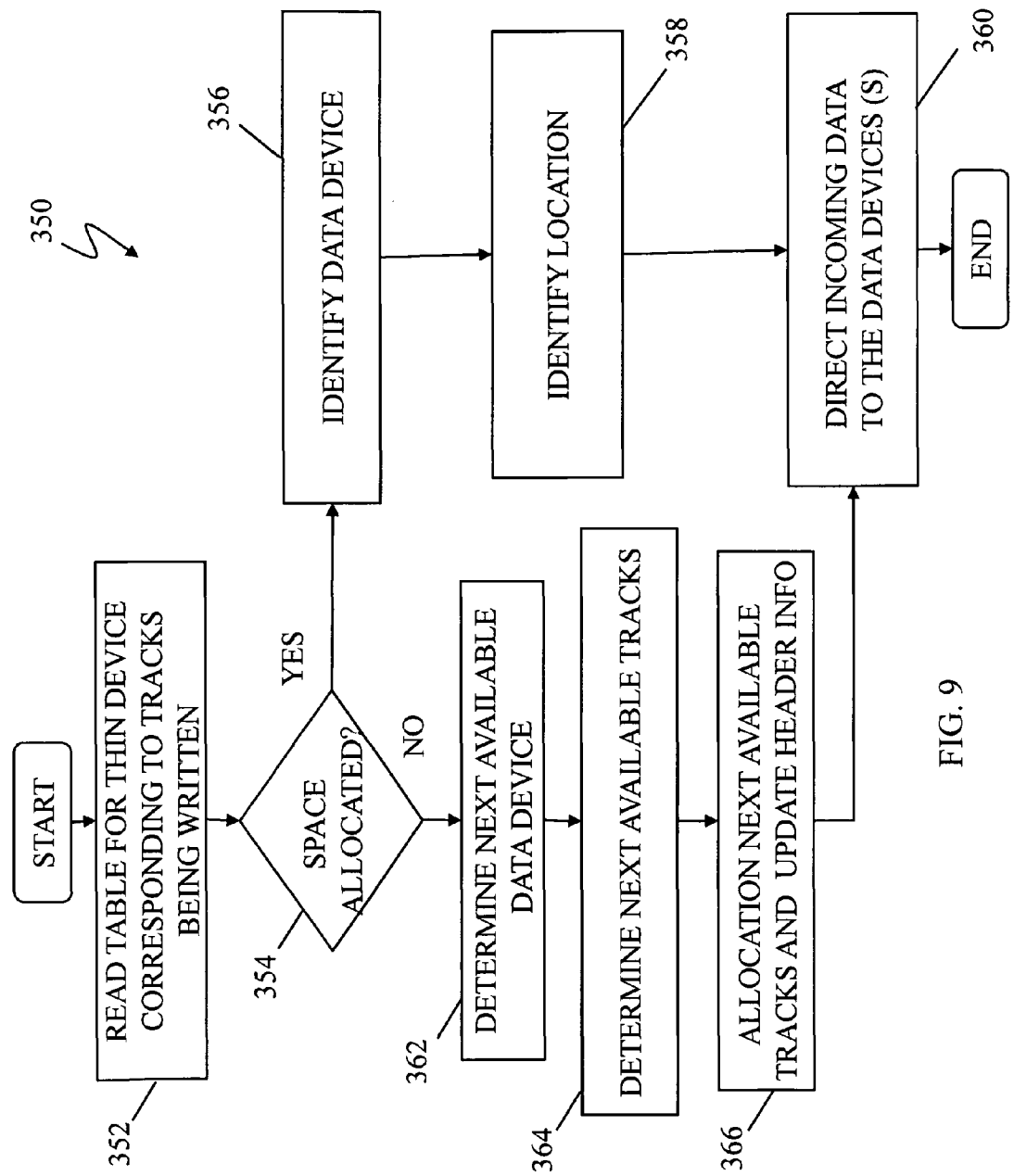
FIG. 9 is a flow diagram illustrating processing for handling a write of logical track(s) to one or more of the thin devices in connection with the system described herein.

FIG. 9 is a flow diagram 350 illustrating processing for handling a write of logical track(s) to one or more of the thin device(s) 71-74 in connection with the system described herein. At a step 352, an appropriate one of the host adapters 28a-28c reads the group table 212 of the one or more of the thin devices 71-74 corresponding to the logical tracks being written.

Following the step 352 is a test step 354 where it is determined whether physical space had been previously allocated (i.e., in a prior write operation) for the tracks being written. If so, then processing proceeds to a step 356 where the data device that includes the tracks is identified. After the step 356, is a step 358 where the track table 222 is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to logical storage space of the data devices. Following the step 358 processing proceeds to a step 360 where the data being written is directed to the appropriate physical storage space. As further discussed elsewhere herein, data may be written among multiple devices in a striping process in which data is advantageously striped across the multiple devices. After the step 360, processing is complete.

If it is determined at the step 354 that there is no physical storage that has been allocated for the logical track(s) being written, then control transfers to a step 362, where a next available data device identifier (i.e., the data device 68) is determined. This information may be obtained from the header 214 of the device table 212.

After the step 362, processing proceeds to a step 364 where available physical storage space on the disk drives 36a-36c is determined. In an embodiment herein, available physical storage space is allocated sequentially from one or more of the disk drives 36a-36c. Following the step 364 is a step 366 where a request may be sent to a disk adapter 38a-38c (or possibly the RA's 32a-32c) to allocate the physical storage space for the write. Also at the step 366, header info is updated to reflect the newly allocated data device and physical tracks. After the step 366, processing proceeds to the step 360, discussed above, where the data being written is directed to the one or more data device sections. After the step 360, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 212 (for example, the entry 216f of the group element 216). Alternatively, the data characteristic information may be stored in a memory, such as the global memory 26 of the storage device 24, and a pointer to this information stored in the group element 216. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be made available for a thin storage device even though the corresponding physical storage space had not yet been allocated. In an alternative embodiment, the policy for the thin device may be to report something less than the total maximum that could be allocated. In some embodiments, used (unavailable) physical storage space may not exceed a predetermined level, e.g. 30%, of the thinly-provisioned storage capacity that appears available to the user.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The thin devices 71-74 may appear to a host coupled to the storage device 24 (and/or, e.g., the storage device 124) as a logical volume (logical device) containing a contiguous block of data storage, as discussed herein. Each of the thin devices 71-74 may correspond to a particular data device, a portion thereof and/or multiple data devices. Accordingly, each of the thin devices 71-74 may map to storage areas across multiple storage volumes. As a result, although each of the thin devices 71-74 may appear as containing a logically contiguous block of storage, each of the thin devices 71-74 may allow for blocks of data to be transparently stored (and/or retrieved) from discontiguous storage pools made up of the varying classes of storage. In this way, the granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the thin device 70 may be a metavolume of concatenated thin volumes/devices, as further discussed elsewhere herein.

Figure 10:
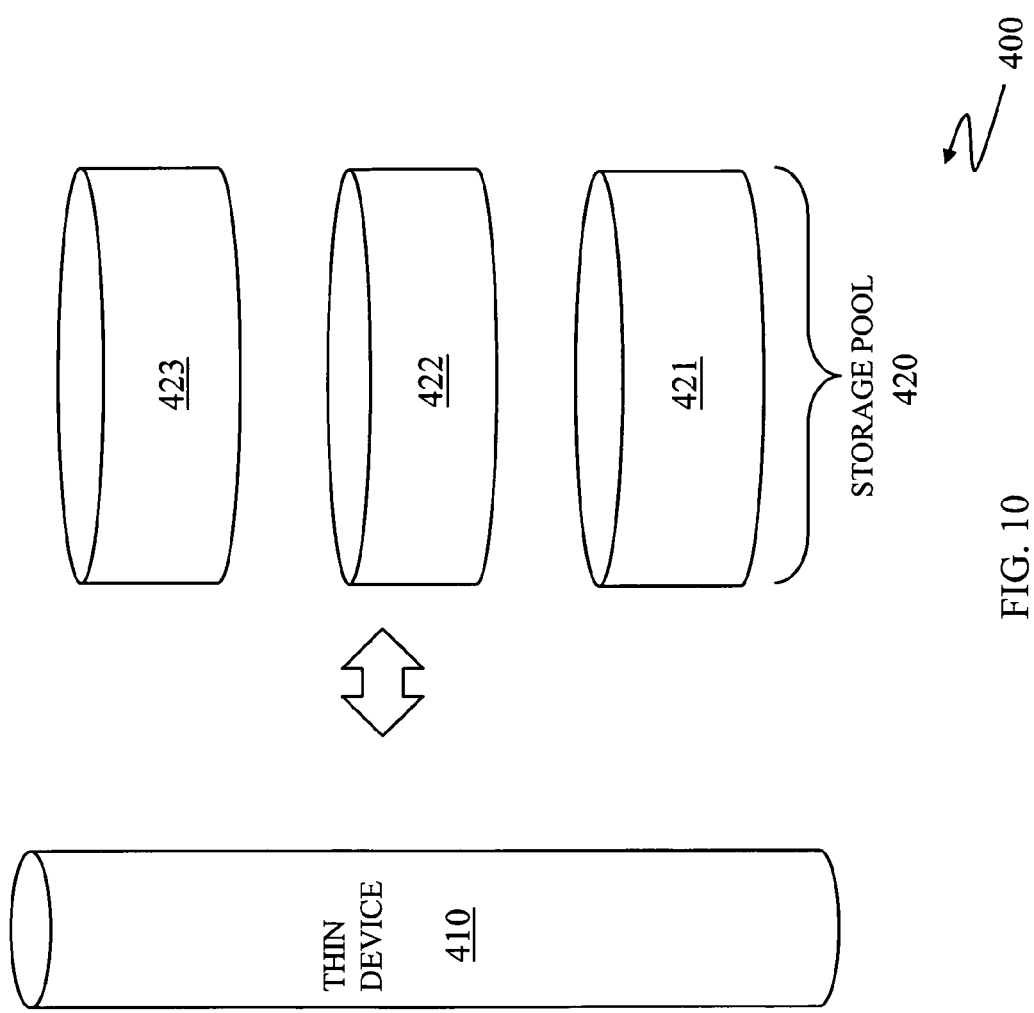
FIG. 10 is a schematic illustration of a storage system including thin provisioning features according to an embodiment of the system described herein.

FIG. 10 is a schematic illustration of a storage system 400 including thin provisioning features according to an embodiment of the system described herein. A thin device 410, that may be like the thin devices 71-74 discussed elsewhere herein, is shown coupled to multiple storage volumes 421-423 forming a storage pool 420 accessible to the thin device 410. As discussed elsewhere herein, each of the volumes 421-423 may include one or more data devices, like the data devices 61-68 discussed elsewhere herein, that map to physical storage areas. The volumes 421-423 may be part of one or more storage devices like that further discussed elsewhere herein.

The thin device 410 may map to the different storage volumes 421-423 although, as noted above, the mapping may not be a direct mapping to physical storage space. A particular thin device may indicate a maximum amount of physical storage space that could be allocated for the thin device (thin-provisioned storage space) even though the corresponding physical storage space has not yet been allocated. As discussed herein, the granularity of the system described herein may be less than at the file level and allow for blocks of data of any size to be stored across multiple storage volumes 421-423 in a process that is transparent to the host and/or host application.

Figure 11:
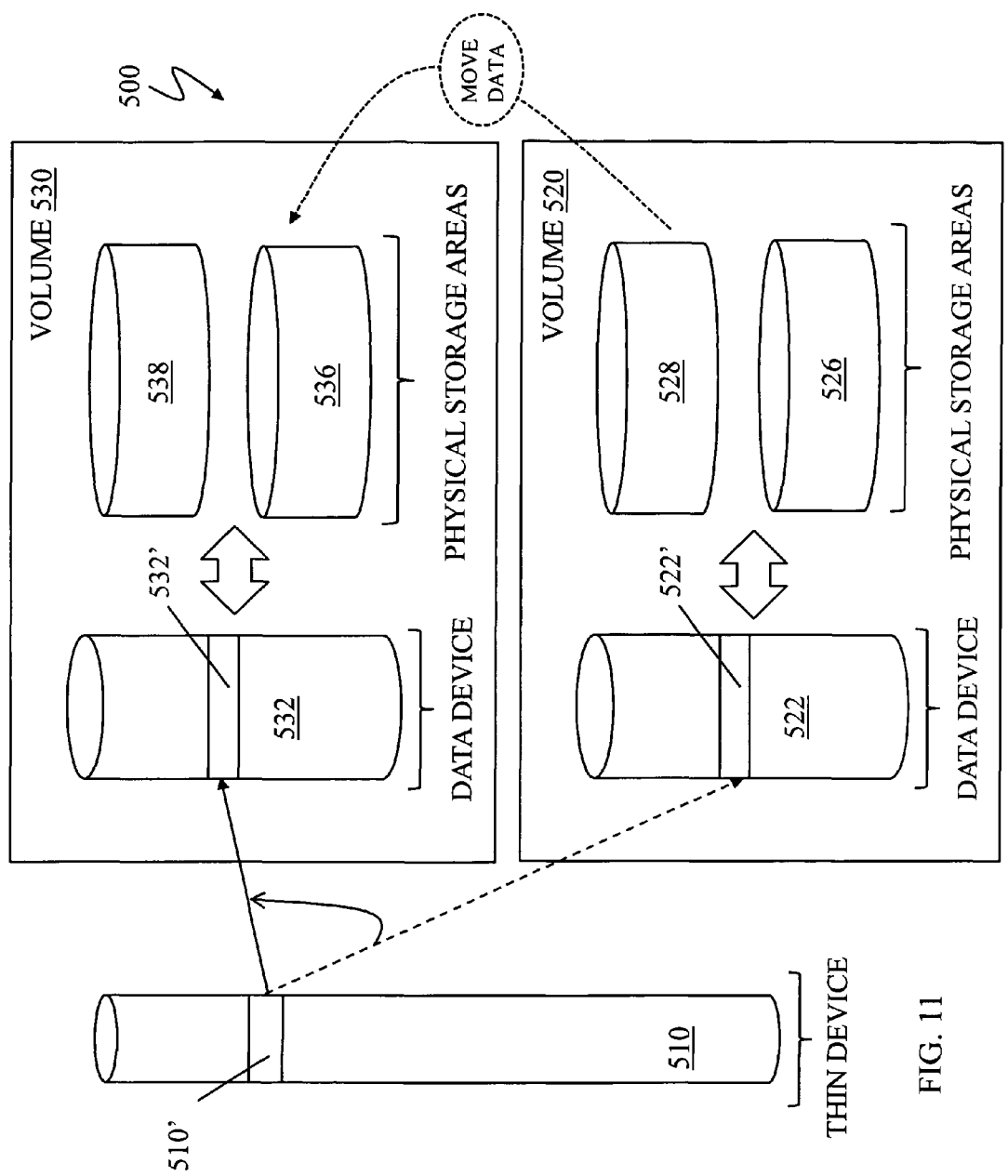
FIG. 11 is a schematic illustration showing a storage device in connection with movement of data using thin provisioning according to an embodiment of the system described herein.

FIG. 11 is a schematic illustration showing an embodiment of a storage system 500 described in connection with movement of data from one storage area to a different storage area involving thin provisioning features according to an embodiment of the system described herein. The storage system 500 may include a thin device 510 and one or more volumes 520, 530. Each of the volumes 520, 530 may include a data device 522, 532 associated with respective physical storage areas 526, 528, 536, 538. Note that, in various embodiments, the thin device 510 may be incorporated into one or more of the volumes 520, 530 and/or be a device that is stored and/or accessed separately therefrom.

According to an embodiment of the system described herein, a portion 510' of the thin device 510 may point to a portion 522' of the data device 522 in connection with a mapping of data stored on the storage volume 520 to one of the physical storage areas 526, 528 of the volume 520. In an embodiment, in connection with moving data from the volume 520 to the volume 530, the pointer from the thin device portion 510' may be modified to point to a new portion 532' of a data device 532 that maps to the new location of the data on the physical storage areas 536, 538 of the volume 530. Data may be moved among volumes of one or more storage pools to normalize utilization of the storage volumes for purposes of appropriately striping data across volumes of the storage pool following the addition of new (empty) volumes to a storage system. It is also noted that in various embodiments, the system described herein may also be appropriately used in connection with "sparse cloning" that allows for more than one thin device to point to a data device as way of providing an efficient cloning mechanism. In this way, cloning operations may be almost instantaneous, involving just the setting of pointers, and initially consume little or no additional physical storage space.

Figure 12:
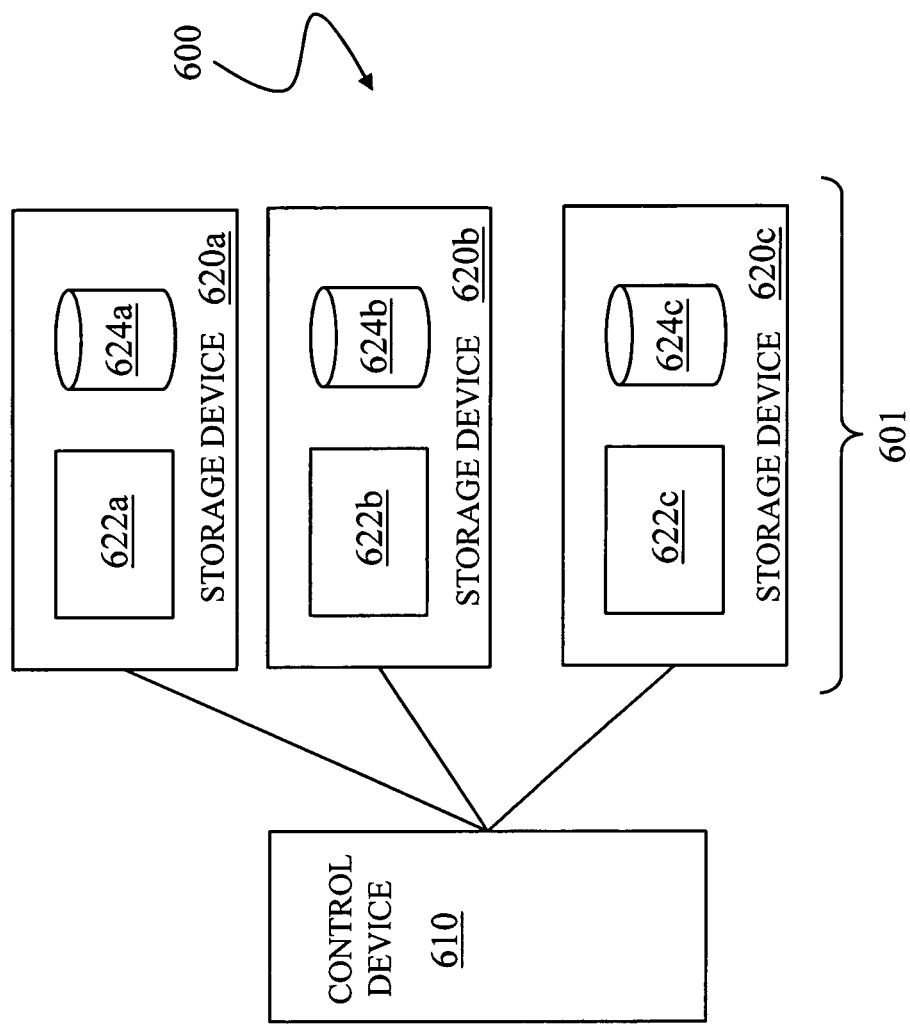
FIG. 12 is a schematic illustration of a storage system that may be used in connection with an embodiment of the system described herein.

FIG. 12 is a schematic illustration of a storage system 600 that may be used in connection with an embodiment of the system described herein. For example, the storage system 600 may be a RAID system. The storage system 600 is shown coupled to storage devices 620a-c, that may each include at least one director 622a-c coupled to at least one volume 624a-c, like that further discussed elsewhere herein, and that together form a storage pool 601. A control device 610 may be provided that is in communication with storage devices 620a-c. The control device 610 may include one or more thin devices, like the thin devices 71-74, and may include other components used in connection with functions of the system described herein.

It is noted that in various embodiments of RAID systems, one or more of the storage devices 620a-c may be a parity device that is used in connection with error correction capability of the RAID system including the use of parity information that is stored on the parity device. Alternatively, it is also noted that parity information may be stored across the storage devices 620a-c rather than being stored in one parity device. Furthermore, in various embodiments, operations involving communication between the storage devices 620a-c of the RAID system may provide mirrored copies of the data blocks replicated across the multiple storage devices and/or operations with portions of the data blocks that are distributed across the multiple storage devices (i.e. striping). Although illustrated with discrete storage devices, in various embodiments, the storage system 600 may include any number of different configurations of disks, disk drives or other storage media coupled to one or more interconnected directors, and it should be noted that other configurations and types of systems involving multiple, redundant storage may be used in connection with the system described herein.

In accordance with the system described herein, it is desirable to address the issue that while thin devices may be expanded as a file system runs, such thin devices may not be easily shrunk. The issue is that once allocated, storage spaces may not be later easily recycled even if they are freed by the file system. Known systems and techniques for reclaiming space, such as use of the Solutions Enabler product by EMC Corporation of Hopkinton, Mass. and "symconfigure" command, include checking all the storage chunks allocated for a specified thin device and reclaiming allocated, but unused (or invalid), storage chunks only if the storage chunks contain all zeroes. Space reclamation may not occur if any byte of a storage chunk is not zeroed. Utilities, such as SDelete, may be used to fill unused spaces of a volume with zeroes; however, such utilities may generate a large number of write I/Os that may have a disadvantageous impact on the system and other applications.

Figure 13:
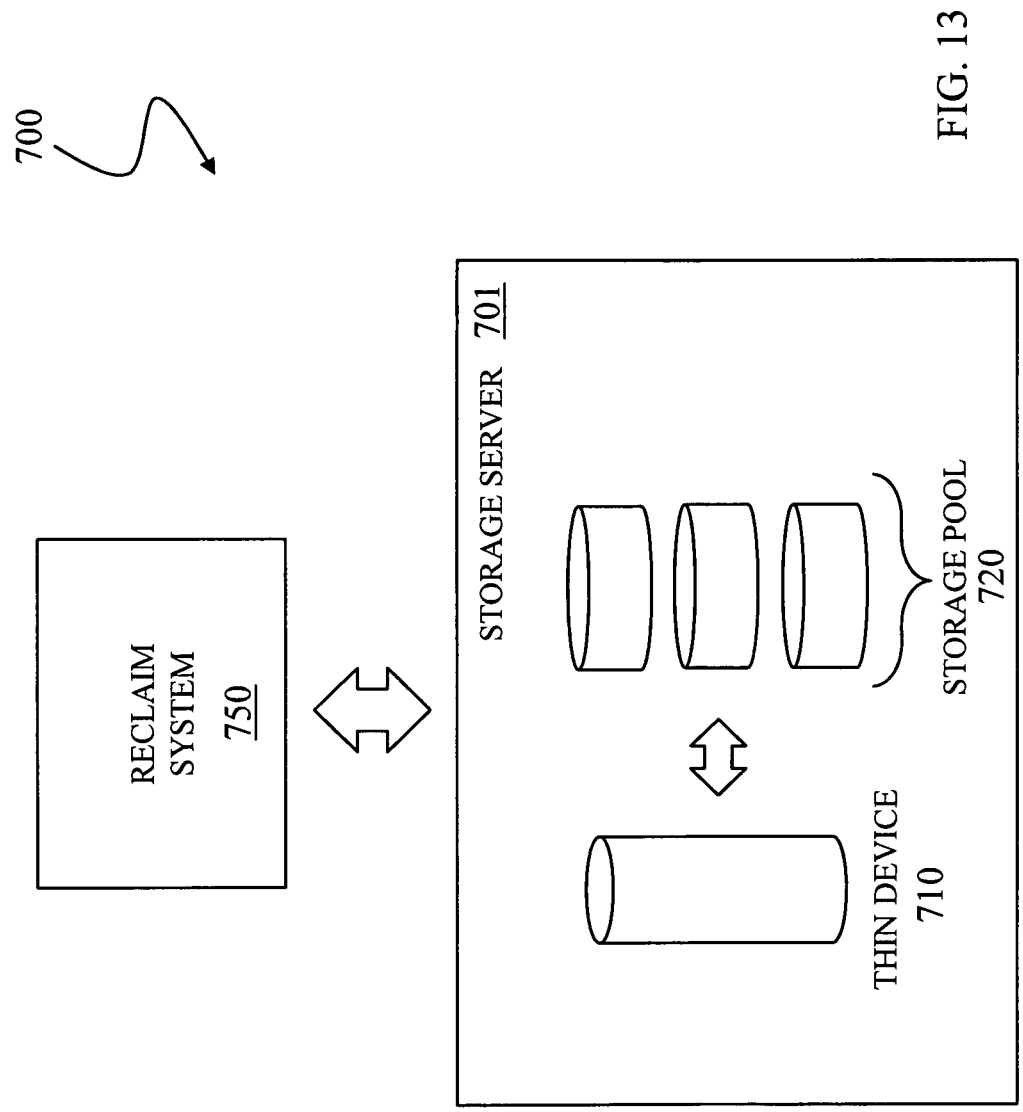
FIG. 13 is a schematic illustration showing a reclaim system according to an embodiment of the system described herein.

FIG. 13 is a schematic illustration 700 showing a reclaim system 750 according to an embodiment of the system described herein. The reclaim system 750 may interface with a storage server 701 that may include a thin device 710 and a storage pool 720 that are like the similarly-named elements discussed elsewhere herein. The reclaim system 750 may include a space reclaiming application and/or device such as a command line utility or other application that frees previously-allocated, but currently unused, storage space in a thin or virtual provisioning environment. The space reclaiming device may be used in connection with a maintenance operation performed upon determining that significant allocated space of a thin device is no longer being used or may be performed periodically to analyze a thin device and free appropriate space back to a thin device storage pool, as further discussed elsewhere herein. In an embodiment, the reclaim system/utility may run online while user applications are accessing a target storage volume.

Figure 14:
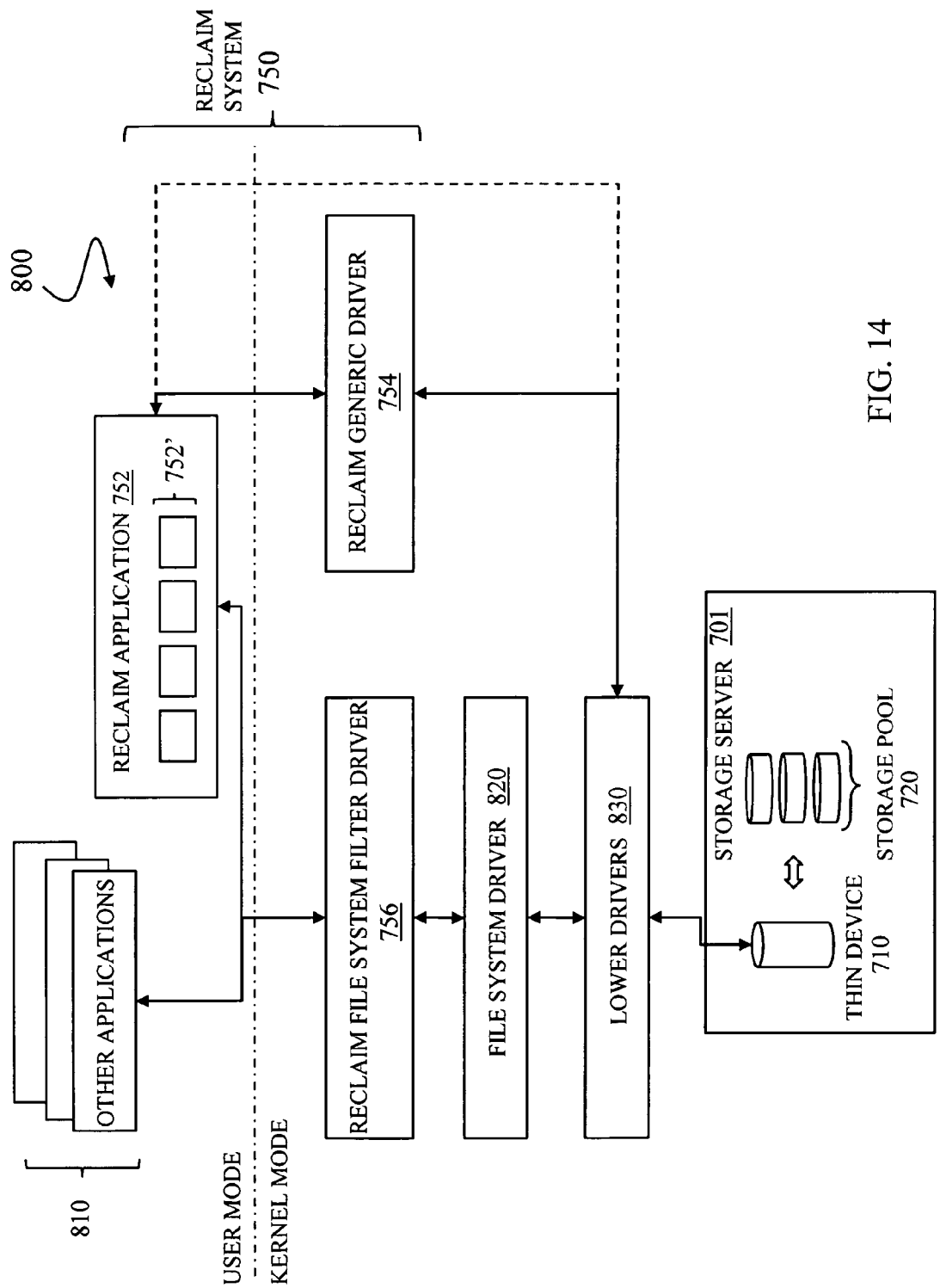
FIG. 14 is a schematic illustration showing a more detailed view of components of the reclaim system, and operation thereof, according to various embodiments of the system described herein.

FIG. 14 is a schematic illustration 800 showing a more detailed view of components of the reclaim system 750, and operation thereof, according to various embodiments of the system described herein. Components of the illustration 800 are shown with respect to operations in user mode and kernel mode. In kernel mode, executing code has trusted access to underlying system hardware and may execute any CPU instruction and reference any memory address. In user mode, executing code cannot directly access hardware or reference memory. Code running in user mode interfaces with system APIs to access hardware or memory, requesting access to the system resources via, for example, a system call. Other applications 810 running in user mode may attempt to access the storage server 701. A file system driver 820 and/or other lower drivers 830, running in kernel mode, may control access of user mode operations to the storage server 701.

The reclaim system 750 may include a reclaim application 752, a reclaim generic driver 754 and a reclaim file system filter driver 756. As further discussed elsewhere herein, the reclaim 750 may include one or more of these components, and include operation using only the reclaim application 752. In an embodiment, the reclaim application 752 may include components and/or modules 752' to control functions of user interface, driver interface, component management and/or task management, among other functions.

A detailed discussion of the modules 752' is now provided according to various embodiments of the system described herein. The user interface module may receive user input to start a reclaiming task, to terminate the task and/or query information or other user instructions. The user interface module may also display output that indicates the effects of the users' operation. The driver interface module may send commands to one or more driver components and notify the driver components of expected behaviors and required information. The driver interface module may also receive information from other driver components. The component management module may control loading or unloading of driver components on demand. The task management module may initialize a reclaiming task after user input is received concerning a command to reclaim a volume. The task management module may further control the performing and ending of the reclaim process. The reclaim application 752 may further send reclaiming commands to the thin device 710. In various embodiments, the reclaim application 752 may send commands directly to the thin device 710 and/or may use one or more drivers, as further discussed elsewhere herein. The reclaim application 752 may include one or more binaries depending on the functions implemented. For example, the reclaim application 752 may include one binary for graphical user interface (GUI) and another for system service.

The reclaim application 752 may run in user mode and be coupled to a reclaim generic driver 754 running in kernel mode. The reclaim generic driver 754 may receive commands from the reclaim application 752 and send the received reclaiming commands to the target volume of the storage server 701. The commands may be send to the storage server 701 via the lower drivers 830 that may control access to the storage server, although it is noted that, in other embodiments, the lower drivers 830 may be incorporated into the storage server 701. The storage server 701 may receive and recognize reclaiming commands and may perform the reclaim process immediately upon receipt of the commands. In an embodiment, a reclaiming command may be a WRITE_SAME command that initiates the freeing of allocated storage blocks according to the processes discussed herein. It is noted that the reclaim generic driver 754 may be optional if reclaiming commands from user mode are not blocked by the operating system, and such an embodiment is illustrated by a dashed line from the reclaim application 752 to the lower drivers 830.

During the reclaim process, a reclaim file system filter driver 756 may monitor the I/O requests to the target volume. In an embodiment, the reclaim file system filter driver 756 may be attached to the target volume of the storage server 701 before the reclaim process is started. In an embodiment, if an IO request is indicated as having failed by the file system because there is not enough space on a disk of the storage server 701, the reclaim process may be aborted and the IO request subsequently reissued to the file system. The reclaim file system filter driver 756 may hold the I/O request and notify the reclaim application 752 of the event. The reclaim application 752 may control the aborting of the reclaim process, delete the balloon files (described in more detail below) and tell the reclaim file system filter driver 756 that these acts have occurred. The I/O request may then be reissued to the lower driver 830 by the reclaim file system filter driver 756. In this way, no IO requests would fail because of the reclaim process, and the reclaim process may be performed without disruption to I/O processing. The reclaim file system filter driver 756 may be detached after the reclaim process is ended, no matter whether the reclaim process is completed or aborted.

An embodiment of the space reclaim process performed by the reclaim system 750 will now be explained in more detail. By way of example, assume the thin device 710 is a thin device with capacity of 100 GB. The thin device 710 may be presented to a Microsoft Windows® platform and a storage volume, such as a New Technology File System (NTFS) volume and/or a fat allocation table (FAT) file system volume, lies in a storage disk of the storage pool 720. In the example, assume the thin device has 20 GB of valid data while 80 GB spaces had been previously written but are no longer being used. Accordingly, from the view of a storage server 701, 100 GB of space from the storage pool 720 has been allocated to the thin device 710 According to the system described herein, it may be determined that the 80 GB of previously allocated, but no longer used, space is to be returned to the storage pool (i.e. reclaimed).

The reclaim process according to an embodiment of the system described herein may include creating one or more balloon files in the target volume to occupy the unused spaces of the file system. It may be noted that the target volume may include physical storage volume and/or may also include a virtual volume. In an embodiment, a utility may be used to create the balloon files, such as fsutil on Windows. After the balloon files are created, the file sizes of the balloon files may be set to variable (e.g., large) amounts, corresponding to the amount of the storage space that is to be reclaimed. In various embodiments, the size of the balloon files may be 100% of the previously allocated, unused space and/or may be a smaller amount, such as 80%-90% of the previously allocated, unused space. For example, four balloon files may be created—three of them at 20 GB in size and the fourth at 10 GB in the described example (total: 70 GB). In case of some file systems (such as NTFS), corresponding volume spaces (e.g., 70 GB) are allocated as soon as the file size is successfully set. Thus, most of the allocated, unused space (80 GB) of the thin device 710 is locked by the balloon files. That is, once the balloon files are created, the allocated, unused space is decreased (e.g., to 10 GB in the present example). As a result, the unused spaces filled by the balloon files will not be used by any other user applications (until being returned to the storage pool), no matter what is done to the spaces by the space reclaiming utility. Data consistency is therefore guaranteed.

The data structure that describes the allocation and location on the disk of the balloon files may then be obtained. The collected allocation information may be parsed and specific commands issued to the thin device 710. The file system may provide the routine to retrieve the variably sized data structure that describes the allocation and location, on disk of specific files, including the balloon files. In an embodiment, the routine of NTFS and FAT32 file systems that may be used to retrieve the data structure is FSCTL_GET_RETRIEVAL_POINTERS. With the returned data, the physical disk spaces of the balloon files may be located and specific commands may be organized and sent based on the identification of the balloon files.

After receiving the commands, the storage server 701 may reclaim the assigned spaces, regardless of whether the spaces are written or not. After all the spaces are reclaimed, the balloon files may be deleted. Once the balloon files are deleted, all the previously locked spaces are returned to the storage pool 720. The reclaimed spaces are then once again available to user applications. The thin device 710 may be updated with respect to the reclaimed storage space. In the noted example, after the spaces are reclaimed, it is seen that 70 GB of storage space has been reclaimed and returned to the storage pool 720. After the reclaim process, only 30 GB of storage space is allocated to the thin device 710 in the storage server 701 (i.e. 20 GB of valid data, and 10 GB of unused space), while the file system still has 20 GB of valid data and 80 GB of free space.

Figure 15:
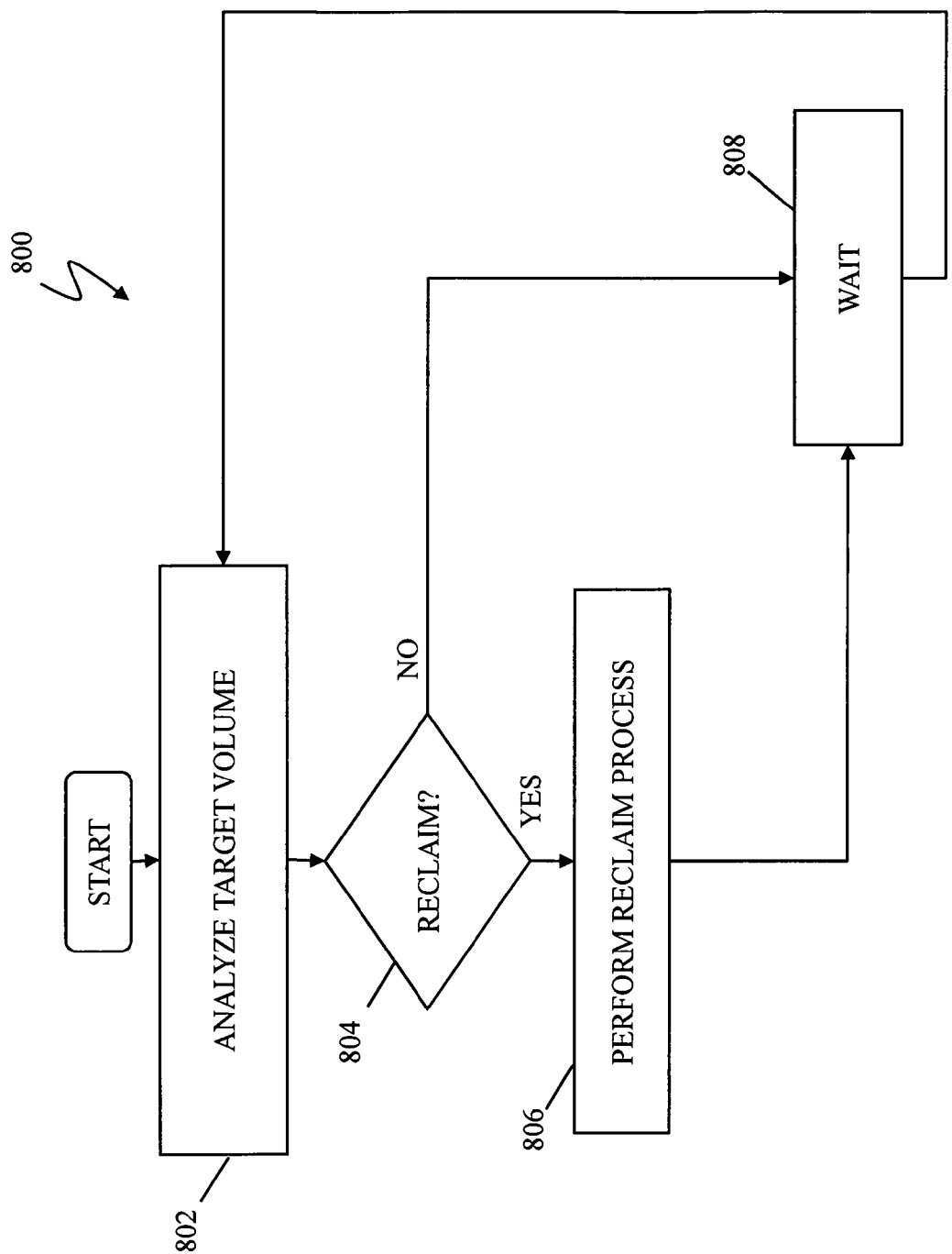
FIG. 15 is a flow diagram showing processing for determining initiation of the reclaim system and/or utility.

FIG. 15 is a flow diagram 800 showing processing for determining initiation of the reclaim system and/or utility. At a step 802, a target volume of a thin provisioning environment is analyzed to determine how much provisioned space of the target volume has been previously allocated but is presently unused (and/or contains invalid data). In an embodiment, the reclaim application and/or other control device, as further discussed elsewhere herein, may be used to analyze storage space usage of a target volume in the thin provisioned environment. After the step 802, processing proceeds to a test step 804 where it is determined whether to initiate the reclaim system. In various embodiments, the determination processing performed at the test step 804 may include automatic initiation as part of a maintenance operation to initiate space reclaiming if a threshold amount or percentage of space of the target volume is determined to be allocated but unused.

Alternatively, a user may manually initiate the space reclaim processing, for example, in response to a prompt informing the user that a certain amount or percentage of space of the target volume is appropriate for a reclaim process. Accordingly, if, at the test step 804, it is determined that space reclaim processing is not to be initiated, then processing proceeds to a waiting step 806. In various embodiments, the waiting step may include waiting for a specified period of time according to periodic maintenance operations and/or waiting for user input and/or other type of system or administrator input that causes a target volume to be analyzed for purposes of reclaiming space. After the waiting step 808, processing proceeds back to the step 802 where analysis of the target volume is performed. If, at the test step 804, it is determined that space reclaim processing is to be initiated, then processing proceeds to a step 806 where a reclaim process is performed, as further discussed elsewhere herein. After the step 806, processing may proceed to the waiting step 808.

Figure 16:
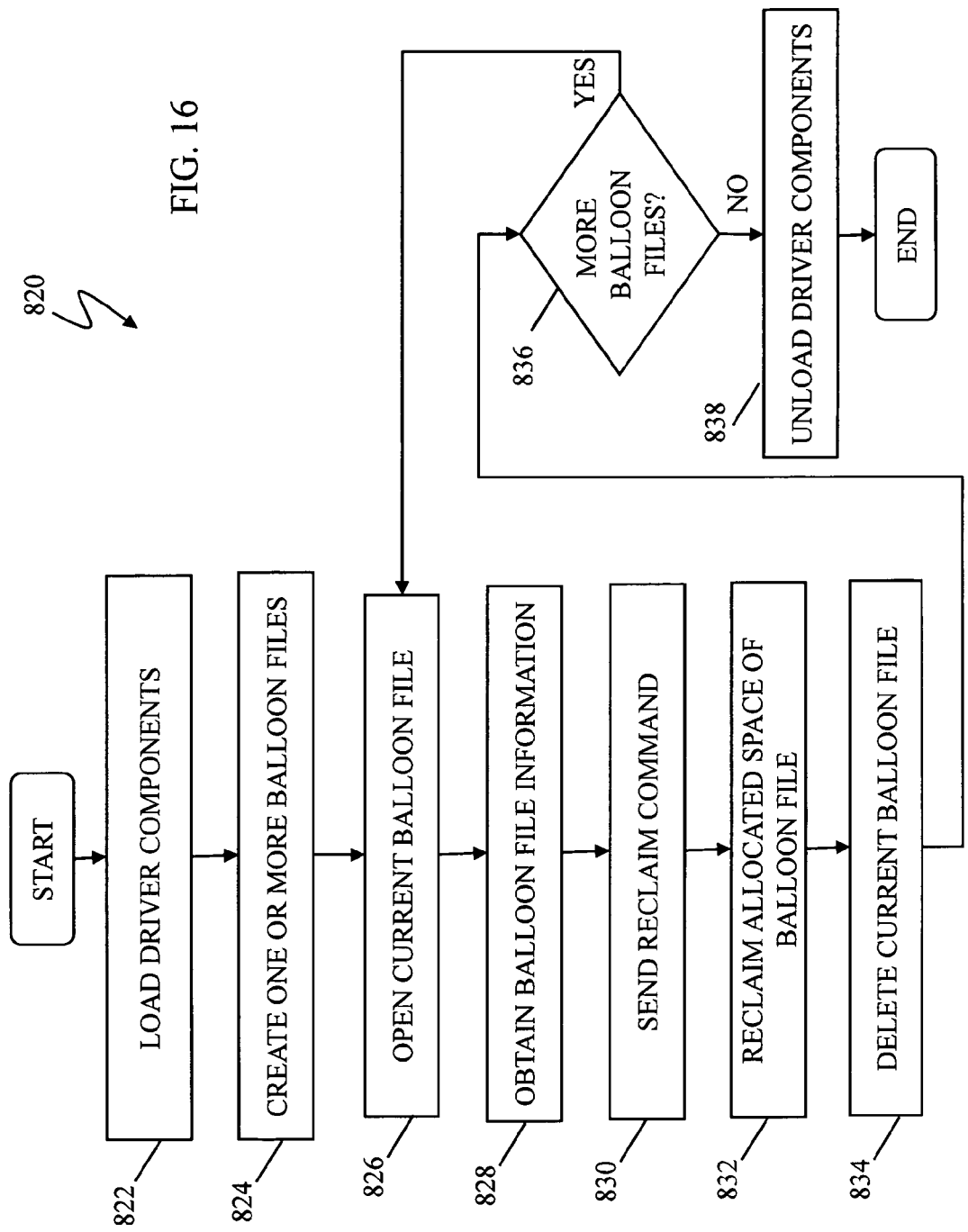
FIG. 16 is a flow diagram showing the reclaim process according to an embodiment of the system described herein.

FIG. 16 is a flow diagram 820 showing the reclaim process according to an embodiment of the system described herein. At a step 822, reclaim driver components may be loaded. After the step 822, processing proceeds to a step 824 where one or more balloon files are created in the target volume corresponding to the amount of space to be reclaimed. As further discussed elsewhere herein, the target volume may be a physical disk and/or may be a virtual volume and the amount of space to be reclaimed may correspond to a desired percentage of allocated but unused space on the target volume. After the step 824, processing proceeds to a step 826 where a current balloon file is opened. After the step 826, processing proceeds to a step 828 where a file system routine is called to determine the allocation and location information of the balloon file on the target volume.

After the step 828, processing proceeds to a step 830 where the collected allocation and location information is parsed and a reclaim command is sent to the target volume concerning the identified balloon file. After the step 830, processing proceeds to a step 832 where the identified spaces of the balloon file are reclaimed. After the step 832, processing proceeds to a step 834 where the balloon file is deleted and the reclaimed spaces are returned to the storage pool for use by other user applications. After the step 834, processing proceeds to a test step 836 where it is determined if another balloon file on the target volume exists. If so, then processing proceeds back to the step 828. If no other balloon files exist on the target volume, then processing proceeds to a step 838 where the reclaim driver components are unloaded. After the step 838, processing is complete.

In other embodiments, the system described herein may be applied in any appropriate operating system. For example, rather than a Windows-based OS, a Unix-based OS may be used. Modifications of the system described herein may be required depending on the particular OS. For example, in Unix, although the balloon files may be created as discussed herein, the Unix system may not include a system API that makes it possible to obtain the allocation and location information of the balloon files sizes using a file system routine (see, e.g., step 828 of flow diagram 820). Accordingly, to obtain information of the location of the balloon files in Unix, a different technique may be used at the step 828. In an embodiment, a command may be issued to write zeroes to the balloon files, for example using the "SDelete" command. However, before the zeroing command is executed at the storage server, the information as to where the zeroes are to be written may be obtained and that information sent for use by the system described herein, similar to use of the information that is received from the file system routine in the Windows-based OS. For example, the information may be obtained using a filter and/or other mechanism that is on the target volume and that recognizes the zeroing command and extracts the location information at the target volume level. The zeroing command may be then be cancelled before actually being executed, thereby avoiding the I/O writes of zeroes to the balloon files.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for reclaiming storage space in a thin provisioning environment, comprising:

creating at least one balloon file in a target volume, wherein the at least one balloon file is a file created in the target volume that occupies storage space to be reclaimed from the target volume and that locks the storage space to be reclaimed from use, wherein the storage space to be reclaimed includes allocated storage space of the thin provisioning environment, and wherein the at least one balloon file is set to a size that corresponds to the storage space to be reclaimed and is identified by a data structure;

obtaining information of the at least one balloon file in the target volume using the data structure;

reclaiming storage space of the target volume according to the obtained information for the at least one balloon file independently of any data in, or input/output (I/O) writes to, the storage space to be reclaimed; and deleting the at least one balloon file, wherein, after deleting the at least one balloon file, the reclaimed storage space is available for use in a storage pool of the thin provisioning environment.

2. The method of claim 1, further comprising:
analyzing the target volume and determining allocated storage space on the target volume that is unused.

3. The method of claim 1, wherein the target volume includes allocated storage space that is unused, and wherein the storage space to be reclaimed includes at least a portion of the allocated and unused storage space.

4. The method of claim 1, wherein obtaining information of the at least one balloon file in the target volume includes initiating a file system routine that obtains the information.

5. The method of claim 1, wherein obtaining information of the at least one balloon file in the target volume includes sending the information from the target volume.

6. The method of claim 1, further comprising:
monitoring I/O requests to the target volume.

7. The method of claim 6, further comprising:
if an I/O request to the target volume is indicated as having failed due to lack of storage space, aborting reclaim processing and reissuing the I/O request.

8. A non-transitory computer readable medium storing computer software for reclaiming storage space in a thin provisioning environment, the computer software comprising:

executable code that creates at least one balloon file in a target volume, wherein the at least one balloon file is a file created in the target volume that occupies storage space to be reclaimed from the target volume and that locks the storage space to be reclaimed from use, wherein the storage space to be reclaimed includes allocated storage space of the thin provisioning environment, and wherein the at least one balloon file is set to a size that corresponds to the storage space to be reclaimed and is identified by a data structure;

executable code that obtains information of the at least one balloon file in the target volume using the data structure;

executable code that reclaims storage space of the target volume according to the obtained information for the at least one balloon file independently of any data in, or input/output (I/O) writes to, the storage space to be reclaimed; and executable code that deletes the at least one balloon file, wherein, after deleting the at least one balloon file, the reclaimed storage space is available for use in a storage pool of the thin provisioning environment.

9. The non-transitory computer readable medium of claim 8, wherein the computer software further comprises:
executable code that analyzes the target volume and determining allocated storage space on the target volume that is unused.

10. The non-transitory computer readable medium of claim 8, wherein the target volume includes allocated storage space that is unused, and wherein the storage space to be reclaimed includes at least a portion of the allocated and unused storage space.

11. The non-transitory computer readable medium of claim 8, wherein the executable code that obtains information of the at least one balloon file in the target volume includes executable code that initiates a file system routine that obtains the information.

12. The non-transitory computer readable medium of claim 8, wherein the executable code that obtains information of the at least one balloon file in the target volume includes executable code that sends the information from the target volume.

13. The non-transitory computer readable medium of claim 8, wherein the computer software further comprises:
executable code that monitors I/O requests to the target volume.

14. The non-transitory computer readable medium of claim 13, wherein the computer software further comprises:
executable code that, if an I/O request to the target volume is indicated as having failed due to lack of storage space, aborts reclaim processing and reissues the I/O request.

15. A reclaim system for reclaiming storage space in a thin provisioning environment, comprising:
a processor;
a reclaim application, executed by the processor, that:
creates at least one balloon file in a target volume, wherein the at least one balloon file is a file created in the target volume that occupies storage space to be reclaimed from the target volume and that locks the storage space to be reclaimed from use, wherein the storage space to be reclaimed includes allocated storage space of the thin provisioning environment, and wherein the at least one balloon file is set to a size that corresponds to the storage space to be reclaimed and is identified by a data structure;
obtains information of the at least one balloon file in the target volume using the data structure;
reclaims storage space of the target volume according to the obtained information for the at least one balloon file independently of any data in, or input/output (I/O) writes to, the storage space to be reclaimed; and
deletes the at least one balloon file, wherein, after deleting the at least one balloon file, the reclaimed storage space is available for use in a storage pool of the thin provisioning environment.

16. The reclaim system of claim 15, further comprising:
a reclaim driver that receives commands from the reclaim application and sends reclaim commands to the target volume.

17. The reclaim system of claim 15, further comprising:
a reclaim file system filter driver that monitors I/O requests for the target volume.

18. The reclaim system of claim 15, wherein the target volume includes allocated storage space that is unused, and wherein the storage space to be reclaimed includes at least a portion of the allocated and unused storage space.

19. The reclaim system of claim 15, wherein obtaining information of the at least one balloon file in the target volume includes initiating a file system routine that obtains the information.

20. The reclaim system of claim 15, wherein obtaining information of the at least one balloon file in the target volume includes sending the information from the target volume.

* * * * *